United States Patent
Figge et al.

(10) Patent No.: US 10,746,220 B2
(45) Date of Patent: Aug. 18, 2020

(54) CONNECTOR, CONNECTING METHOD AND A PRODUCTION METHOD FOR SAME

(71) Applicant: BÖLLHOFF VERBINDUNGSTECHNIK GmbH, Bielefeld (DE)

(72) Inventors: Hans-Ulrich Figge, Schloß Holte-Stukenbrock (DE); Andreas Metten, Borgholzhausen (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 600 days.

(21) Appl. No.: 15/300,330

(22) PCT Filed: Mar. 31, 2015

(86) PCT No.: PCT/EP2015/057104
§ 371 (c)(1),
(2) Date: Sep. 29, 2016

(87) PCT Pub. No.: WO2015/150419
PCT Pub. Date: Oct. 8, 2015

(65) Prior Publication Data
US 2017/0138388 A1    May 18, 2017

Related U.S. Application Data

(60) Provisional application No. PCT/EP2015/057104, filed on Mar. 31, 2015.

(30) Foreign Application Priority Data

Mar. 31, 2014 (DE) .......................... 10 2014 206 071

(51) Int. Cl.
*F16B 43/02* (2006.01)
*F16B 37/04* (2006.01)

(52) U.S. Cl.
CPC .................... *F16B 37/041* (2013.01)

(58) Field of Classification Search
CPC ............................... F16B 37/04; F16B 37/041
(Continued)

(56) References Cited

U.S. PATENT DOCUMENTS 3,118,480 A * 1/1964 Kreider ................. F16B 37/041
411/173
4,219,064 A * 8/1980 Lozano ................. F16B 37/041
411/103

(Continued)

FOREIGN PATENT DOCUMENTS

CN       1381678 A     11/2002
DE     10354062 A1      6/2005
(Continued)

OTHER PUBLICATIONS

CN Office Action for CN Application No. 201580018090.X dated Jul. 3, 2017, 4 pages.
(Continued)

*Primary Examiner* — Gary W Estremsky
(74) *Attorney, Agent, or Firm* — Reising Ethington P.C.

(57) ABSTRACT

A connector for at least a first and a second component having a distance therebetween, especially an at least two-piece edge connector, comprising the following features: a first leg having a first opening as a first part and a second leg having a second opening as a second part which are connected movably to each other by means of a one-sided form-fit connection so that a distance between the first and the second leg is freely adjustable in a given interval and a component with a component opening is receivable between the first and the second leg and the connector is fastenable by means of a fastening element in the component opening.

13 Claims, 18 Drawing Sheets

Figure 1:
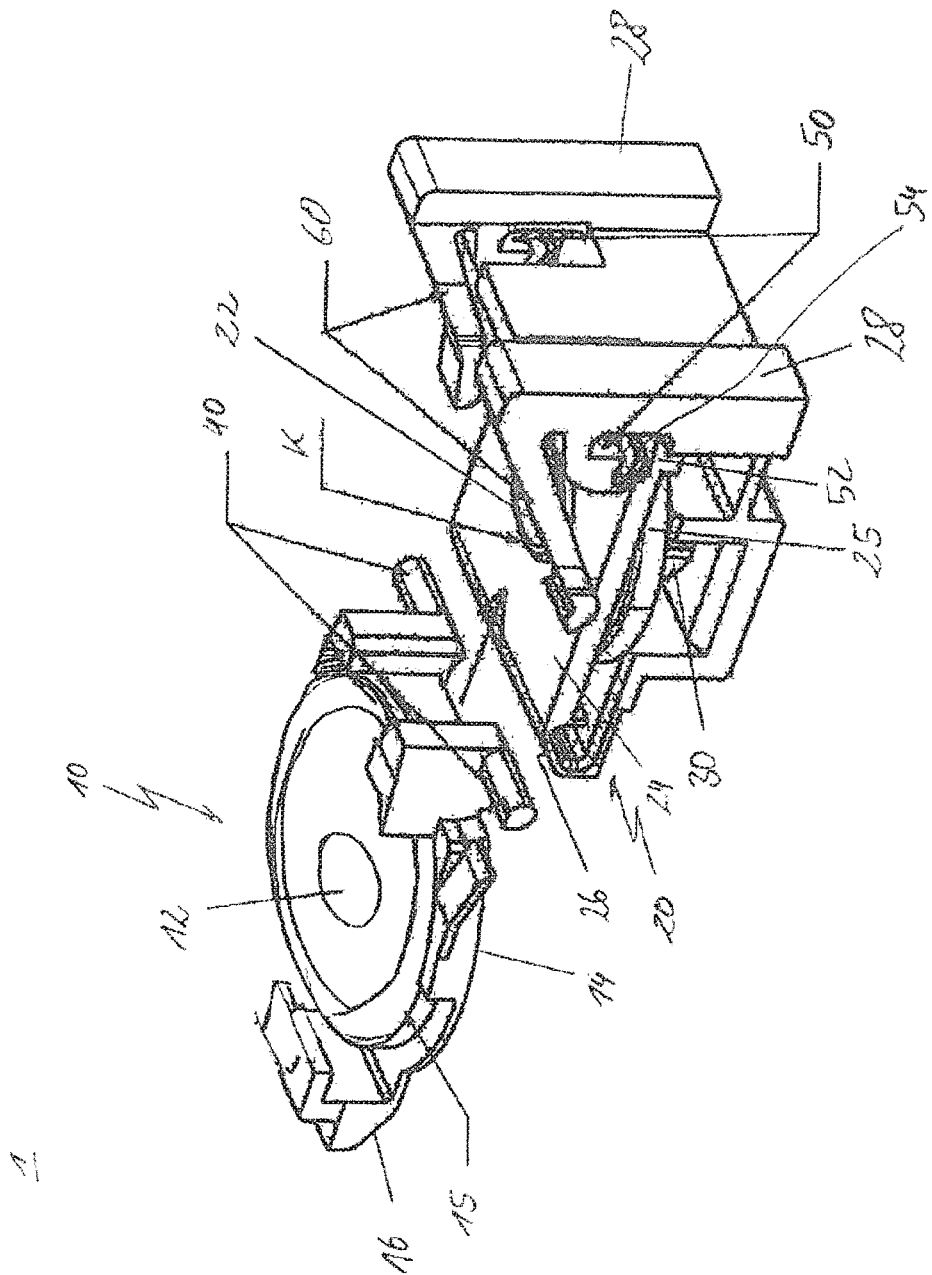

(58) Field of Classification Search
USPC .......... 24/458; 411/546, 170, 172, 174, 175; 16/235, 248
See application file for complete search history.

(56) References Cited

U.S. PATENT DOCUMENTS

| | | | | |
|---|---|---|---|---|
| 4,348,140 | A * | 9/1982 | Bergholz | F16B 5/0208 403/408.1 |
| 4,396,326 | A * | 8/1983 | McKinnie, III | F16B 37/041 411/103 |
| 4,676,706 | A * | 6/1987 | Inaba | F16B 37/041 411/175 |
| 6,287,064 | B1 * | 9/2001 | Jhumra | F16B 37/043 411/112 |
| 6,585,447 | B2 * | 7/2003 | Schwarzbich | F16B 5/0233 403/299 |
| 6,669,420 | B2 | 12/2003 | Ikuta | |
| 6,776,566 | B2 * | 8/2004 | Kobusch | F16B 5/0283 411/432 |
| 6,854,941 | B2 * | 2/2005 | Csik | F16B 37/044 411/111 |
| 7,182,563 | B2 | 2/2007 | Wimmer et al. | |
| 7,837,225 | B2 * | 11/2010 | Gosis | B25B 31/00 24/297 |
| 8,276,241 | B2 * | 10/2012 | Wu | E05D 7/0415 16/235 |
| 8,696,279 | B2 * | 4/2014 | Sbongk | F16B 5/02 411/174 |
| 2002/0002756 | A1 * | 1/2002 | Sato | E05D 3/022 16/235 |
| 2002/0071737 | A1 | 6/2002 | Ikuta | |
| 2003/0115718 | A1 * | 6/2003 | Bechthold | E05D 7/0045 16/235 |
| 2006/0226312 | A1 | 10/2006 | Masuch | |
| 2007/0243038 | A1 * | 10/2007 | Rausch | F16B 37/041 411/91 |
| 2009/0282655 | A1 | 11/2009 | James | |
| 2011/0308041 | A1 * | 12/2011 | Le | E05D 3/022 16/248 |

FOREIGN PATENT DOCUMENTS

| | | |
|---|---|---|
| DE | 10358379 A1 | 7/2005 |
| DE | 102004058938 A1 | 6/2006 |
| DE | 202008016230 U1 | 4/2010 |
| DE | 102009035874 A1 | 2/2011 |
| DE | 102012207142 A1 | 10/2013 |
| DE | 102012016495 A1 | 2/2014 |
| GB | 597104 | 1/1948 |
| JP | H10220448 A | 8/1998 |
| WO | WO2005047712 A1 | 5/2005 |

OTHER PUBLICATIONS

Written Opinion & International Search Report for PCT/EP2015/057104 dated Jan. 15, 2016, 11 pages.
EP Office Action for EP Application No. 157739711 dated Sep. 19, 2019 (6 pages).

* cited by examiner

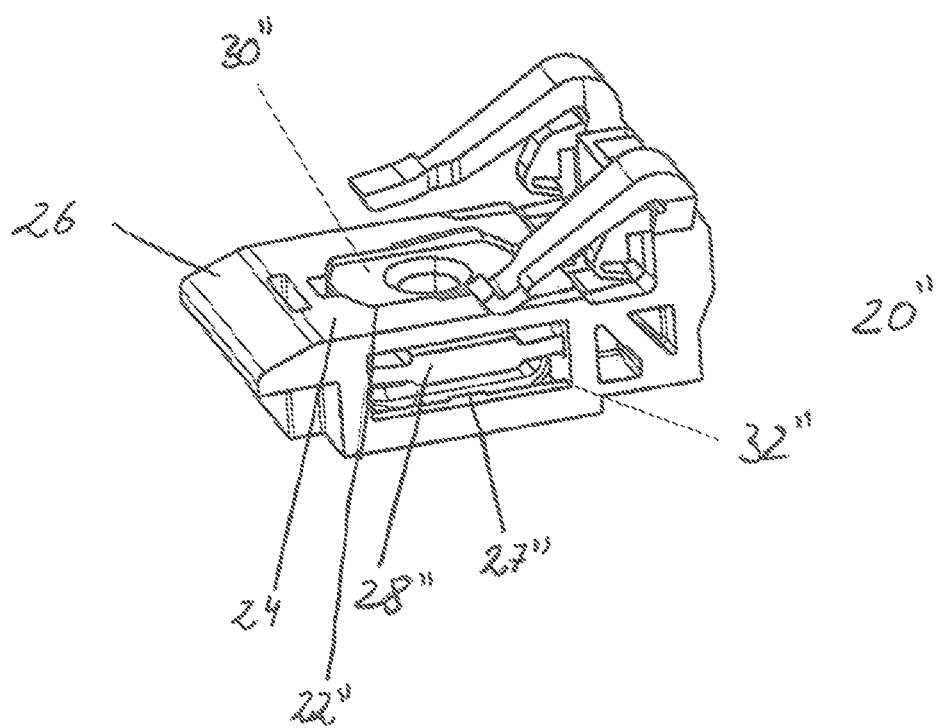

CONNECTOR, CONNECTING METHOD AND A PRODUCTION METHOD FOR SAME

1. TECHNICAL FIELD

The present disclosure is related to a connector for at least two components with a distance therebetween, especially an edge connector for a component having a component opening close to the edge. Further, the present disclosure is related to a connecting method of a first and a second component with a distance therebetween by means of the mentioned connector. Further, the present disclosure is related to a production method for this connector.

2. BACKGROUND

In the prior art, the problem is known to connect two components with each other with a distance arranged therebetween. This is especially a problem if the first component has a component opening indeed arranged close to the edge of the component but no fastening thread or the like is present at the component itself or on the inner side of the component opening. In this case, it is necessary to provide first of all a fastening possibility, as for example a threaded element, close to the component opening by means of an appropriate connector, especially an edge connector. Further, a connector has to be fastened in this component opening so that the first component can be connected to a further component.

For this purpose, brace-like or clamp-like connectors are laterally plugged onto the edge of a component. Such connectors are for example described in U.S. Pat. No. 4,676,706 and DE 103 58 379 A1. These clamp-like connectors being movable onto the edge of the component each have an appropriate fastening element which is positioned at the component opening by means of the connector. This fastening element is for example a hexagonal nut having an inner thread which is either connected integrally to the connector or which is held therein. Due to the clamp-like structure, the known connectors have two legs being arranged oppositely to each other. The edge of the component is received between these legs. Therefore, it is necessary that the distance of the oppositely arranged legs is adjustable to the thickness of the first component. As the two opposing legs of the connectors of U.S. Pat. No. 4,676,706 and DE 103 58 379 A1 are, however, connected to each other by means of a rigid piece of wall, these connectors provide no freedom of adjustment with respect to the distance of the two oppositely arranged legs if the component thickness exceeds or deceeds the predefined distance of the two legs in the connector.

DE 103 54 062 A1 and DE 20 2008 016 230 U1 each describe a connector at which the oppositely to each other arranged legs are connected by means of a film hinge. This film hinge is characterized by a certain flexibility so that here components with different thickness between the two legs are receivable. As, however, the two legs are permanently connected by means of the film hinge and across the complete width of the legs, for example a component of high thickness results in an excessive spreading of the legs which are connected to each other. By means of this spreading, for example the fastening element in the lower leg of the connector is no longer arranged coaxially with respect to the component opening and the opening in the upper leg of the connector. This has the disadvantage that a fastening screw which is inserted into the connector cannot be fastened anymore in the thread of the lower leg. Further, it may come to misalignment between the two components if the upper leg also does not abut the first component two-dimensionally due to the spreading based on the thickness of the first component.

DE 103 54 062 A1 and DE 20 2008 016 230 U1 describe also the combination of such an edge connector with a tolerance-compensating element. For this purpose, the upper leg of the connector is provided with a threaded element in which an adjusting element is guided. As the thread of the threaded element has a thread turn direction opposite to the thread turn direction of the inner thread of the fastening element at the lower leg, an adjusting element is displaced until abutment of the second component during the screwing in of a fastening screw. Only then, a tightening of the fastening screw within the connector occurs.

DE 10 2009 035 874 A1 also describes a clamp-like edge connector which can be plugged onto the edge of a component with a component opening. A fastening element with an inner thread is molded or formed in the lower portion of the clamp-like connector, wherein the fastening element can be positioned at the exit of the component opening of the component by means of the connector. The edge connector is formed L-like for being adjustable to different component thicknesses. The fastening element is held by means of flexible webs at the shorter L-leg. Indeed, these webs are deflectable so that components with different thickness can be received in the edge connector but the retaining of the fastening element by means of the flexible webs requires a large installation space at the edge of the component. Further, the fastening element is deflected by the flexible webs along a circular path when the edge connector is adjusted to a specific component thickness. This leads to misalignments between the fastening element and a fastening screw to be screwed into the connector.

It is thus the object of at least certain implementations of the present invention to provide a connector, especially an edge connector, for a component with a component opening arranged close to its edge which is flexibly adjustable to different component thicknesses without creating thereby inner misalignments.

3. SUMMARY

The above object may be solved by a connector according to the independent patent claim 1, a connecting method for a first and a second component having a distance therebetween by means of the connector according to the independent patent claim 13 as well as by a production method for this connector according to the independent patent claim 15. Advantageous embodiments and developments of a connector, connecting method and production method result from the following description, the accompanying drawings and the appending claims.

The connector for at least a first and a second component having a distance therebetween is preferably an at least two-part edge connector which can be plugged onto the edge of components of different thickness. The connector has the following features: a first, preferably areal or flat, leg with a first opening as a first part and a second, preferably areal or flat, leg with a second opening as a second part which are movably connected to each other by means of a one-sided form-fit connection so that a distance between the first and the second leg is adjustable in a predefined interval and a component having a component opening is receivable between the first and the second leg and the connector is fastenable in the component opening by means of a fastening screw.

The first and the second areal or flat leg of the connector are arranged oppositely to each other. The areal formation of the legs serves for the areal legs to abut a component surface. This ensures a sufficient support of the connector by means of the component surface. As the present connector, preferably an edge connector, is used for components of different component thickness, the two legs have to be variably adjustable in their distance to each other. This adjusting possibility provides the form-fit connection provided one-sided at the first and the second leg. This form-fit connection ensures on the one hand a variation of the distance of the two legs with respect to each other, wherein an orientation of the two legs to each other is substantially maintained. Further, the form-fit connection between the two legs allows an angular opening of the legs connected to each other so that a component is positionable between the oppositely arranged legs in a simple manner.

Preferably, the distance between the two legs of the connector may be steplessly or continuously adjustable, thus free in a distance interval of the legs which is defined by at least one elongated hole. A further embodiment provides that the distance between the two legs is adjustable in steps. Constructively, with respect to the first embodiment, a guiding elongated hole is provided with a smooth inner wall. With respect to the second embodiment, the at least one elongated hole comprises a stepped inner wall defining a grid. Within this grid, the rotational axis of the one leg is held displaceable in steps while the respective elongated hole is arranged on the other leg.

According to a first embodiment of the connector, the first and the second leg are connectable to each other by means of a pivoting axis and pivotably around the pivoting axis, wherein the pivoting axis is arranged perpendicular displaceable with respect to their course of direction. The pivoting axis may be arranged in at least one elongated hole, preferably two oppositely positioned elongated holes, having a longitudinal extension beyond a plane of the first and the second leg. The at least one elongated hole is constructed such that it guides the rotational axis displaceable freely or in steps, as it has been explained already above.

The form-fit connection between the first leg and the second leg of the connector may be realized by a pivoting axis guided in elongated holes. The pivoting axis consists of any possible construction which allows a rotating or a pivoting of the legs around this pivoting axis. Therefore, it is for example preferred to form the first leg with a continuous pivoting axis, an open-worked pivoting axis, two pins which form the pivoting axis or by a similar appropriately formed web, which is formed round in its cross-section and thus supporting the pivoting of the leg. Further, the pivoting axis, regardless of the construction, is received in oppositely arranged elongated holes. These elongated holes ensure a displacement of the pivoting axis in the direction of the longitudinal extension of the elongated holes. Thus, the course of direction of the longitudinal extension of the elongated holes defines in which direction the legs can vary in their distance to each other.

According to a further embodiment, this course of direction of the elongated holes is arranged perpendicularly to the respective area of the legs. Thus, a displacement of the pivoting axis within the elongated holes preferably results in an enlargement or reduction of the distance between the two oppositely arranged legs of the connector. Further, the form-fit connection between the first and the second leg ensures that they are arranged pivotably around the same rotational axis. Based on this pivoting, the two legs can be arranged opened by a specific angle or spaced from each other so that the edge of a component can be easily introduced between the two legs. While the areas of the legs each abut the component surface, the rotational axis is displaced within the elongated holes perpendicular to their course of direction until the legs are spaced from each other by the thickness of the component inserted therebetween.

According to a further embodiment of the connector, the second leg thereof has a fastening thread adjacent to the second opening, wherein this fastening thread is preferably formed by a nut held in a cage or by a thread molded or formed in the second leg. The connector serves as edge connector as it has been explained already above. In the portion of a component opening close to the edge of the component, the edge connector is plugged onto the component. This plugging procedure has the object to align the respective opening in the leg of the connector coaxially with the component opening. As the second leg of the connector is provided with the fastening thread, a fastening screw can be screwed into the component opening by means of the fastening thread. This fastening serves for example for connecting a second component to the first component and its component opening at least spaced by the thickness of the first leg of the connector. This connection is for example realizable by a component opening provided in the second component. The fastening thread in the second leg is realizable in different constructive ways. According to a further embodiment, the leg forms a cage in which a nut or a similar threaded element is held rotation-proof. It is also preferred to provide an integrally formed fastening thread at the second leg of the connector. If the second leg of the connector is for example produced from plastic, this fastening thread can be realized in a preformed thickening of the second leg. According to a further embodiment, the thread is molded or formed in the second leg. In this context, molding or forming comprises that a thread is cut into the second leg, a threaded insert is fastened in the second leg during an injection molding method or generally a casting method or that a nut or a threaded insert is warmly pressed into the second leg or that a nut is molded into the second leg.

According to a further embodiment of the connector, the fastening thread is formed by a nut held in a cage. According to a further embodiment, the nut is movable within the cage laterally to be able to compensate misalignments between fastening screw and nut. At the same time, the nut is held rotation-proof in the cage. According to a further embodiment, the nut has a longitudinal extension so that it extends through the component opening of the first component in the fastened condition of the second leg for being supportable at the first leg.

Depending on the clamping forces by means of which the connector and especially the second leg has to be fastened at the first component, different constructions of the first leg are preferred. Especially at high clamping forces, an excessive mechanical load of the second leg consisting of plastic should be avoided as the plastic tries to establish the mechanical load under the influence of the clamping forces. This leads to a weakening of the connection between the second leg and the first component which is undesired for the lifespan of the connection.

Therefore, according to a further embodiment, the nut has a specific length parallel to its threaded opening. Due to this longitudinal extension of the nut and the open design of the second leg in the direction of the first component, the nut can extend through the component opening in the fastened condition of the second leg and can be fastened abutting the first leg. As, due to the longitudinal construction of the nut, the nut preferably abuts directly a reinforcement element of the first leg, the interposed plastic layers which affect the fastening of the connector are avoided. This improves the fastening of the second leg at the first component whereby the field of application of the connector is increased.

Preferably, the second leg may be braceable against the first component in a press-fit by means of the nut. Further comprises the first leg a reinforcement, preferably a metal disc, which protrudes at least partly into the component opening of the first component so that the reinforcement is engageable by the nut, preferably directly.

For further stabilizing the connector and especially the first leg, the first leg comprises a reinforcement element. This reinforcement element is formed by a disc through which the fastening screw protrudes centrally. Due to the symmetric opening of the disc, it provides a continuous circumferential edge at which, for example, the above discussed nut can be supported. While plastic materials of different hardness are suitable for this disc, it is also preferred to provide this disc made of materials of high strength, as for example metal, ceramic and the like. Such stable materials not only support the mechanical reliability of the connector but at the same time resist the effect of chemical aggressive media.

While the longitudinal nut abuts directly the reinforcement of the first leg, preferably the second leg is fastened between the nut and the first component by a clamping press-fit. For this purpose, the nut engages at at least one fastening web within the cage of the second leg to press the second leg against the first component by means of this fastening web, preferably resiliently. This indirect fastening of the second leg at the first component reduces the mechanical load of the material of the second leg and thus its relaxation behavior. In this way, the lifespan of the second leg and thus of the connector is increased and at the same time the risk of a damaging of the second leg during the fastening procedure is reduced.

According to a further embodiment of the connector, the first leg of the connector comprises a tolerance compensating element for compensating tolerances between the first and the second component. Preferably, the first leg comprises to this end a threaded element in the inner thread of which an adjusting element is guided, wherein a first thread turn direction of the inner thread is opposed to a second thread turn direction of the fastening thread of the second leg. Further, the adjusting element comprises an inner dragging element by means of which a frictional connection with a fastening screw is producible. As soon as the fastening screw is screwed into the adjusting element, the dragging element follows the rotation of the fastening screw due to this frictional connection. As the first thread turn direction of the inner thread of the adjusting element is opposed to the thread turn direction of the thread of the fastening screw, the rotation of the fastening screw produces a screwing of the adjusting element out of the threaded element of the first leg. This adjusting element is screwed out so far until it abuts the second component and compensates in this way a distance tolerance which is present between the first and the second component.

According to a further embodiment of the connector, at least one spring arm is provided at the connector by means of which the first and second leg of the connector are pre-tensionable with respect to each other. The at least one spring arm creates a spring pretension which presses the two oppositely arranged legs against each other or at least pretensions them towards each other. This spring pretension results in that the areal legs are pressed against the component surfaces after the inserting or during the inserting of a component between the first areal leg and the second areal leg. In this way, the two areal legs of the connector are arranged ideally adjacent to the component surface. As it can be assumed that the oppositely arranged component surfaces of a component, for example in the edge area of the component, are arranged parallel to each other, the spring pretension between the two legs ensures that the first leg and the second leg are in a parallel alignment with respect to each other. As no angular orientation between the two legs is present, it is ensured that the fastening screw can be ideally inserted or screwed into the connector.

The present disclosure comprises further a connecting method for a first and a second component having a distance therebetween by means of the connector, as it has been described above in the different embodiments. The connecting method comprises the following steps: inserting the first component between the first and the second leg of the connector and at this displacing the first and second leg guided with respect to each other by means of the form-fit connection and fastening a second component with a fastening screw at the first component with connector by screwing the fastening screw into a fastening thread of the second opening of the second leg. Preferably, the connecting method comprises the further step: displacing an adjusting element into abutment with the second component by screwing the fastening screw into the adjusting element so that tolerances between the first and second component are compensated.

The present disclosure comprises further a production method for a connector, especially an at least two-piece edge connector comprising the following steps: providing, preferably injection molding, a first leg of plastic, comprising a first opening and a pivoting axis, providing, preferably injection molding, a second leg of plastic, comprising a second opening and at least one elongated hole seat or slot of the pivoting axis and inserting the pivoting axis into the elongated hole seat so that the first and second leg are arranged pivotable and displaceable with respect to each other. Within the production method, it is further preferred to provide a fastening thread at the second leg in which a fastening screw is receivable, preferably by means of arranging a nut in a cage of the second leg or by means of molding or forming a thread or a nut in or at the second leg. This fastening thread serves according to the above description for the fastening of the edge connector in a component opening of the component close to the edge. Further, it is preferred to fasten a further component at the first component by means of the fastening screw and the mentioned fastening thread which is only spaced by the first leg of the connector. It is further conceivable to realize a larger distance between the first and the second component by means of this connector.

According to a further embodiment of the production method, the providing of a spring arm in the first or second leg by means of which the first and the second leg are spring-pre-tensionable with respect to each other takes place. This spring arm and the spring pretension produced therewith between the two oppositely arranged legs ensures an ideal orientation of the areal legs at the surface of the component. Preferably, two oppositely arranged spring arms are provided which are formed tongue-like. While the one end of the spring arm is fastened at the second leg, the second end of the spring arms presses onto the first leg so that the two legs are pretensioned against each other by means of an establishing spring pretension.

According to a further preferred step of the present production method, an adjusting element is provided in a threaded element of the first leg, wherein an inner thread of the threaded element of the first leg has a thread turn direction opposite to the fastening thread of the second leg.

4. DESCRIPTION OF THE DRAWINGS

Figure 2:
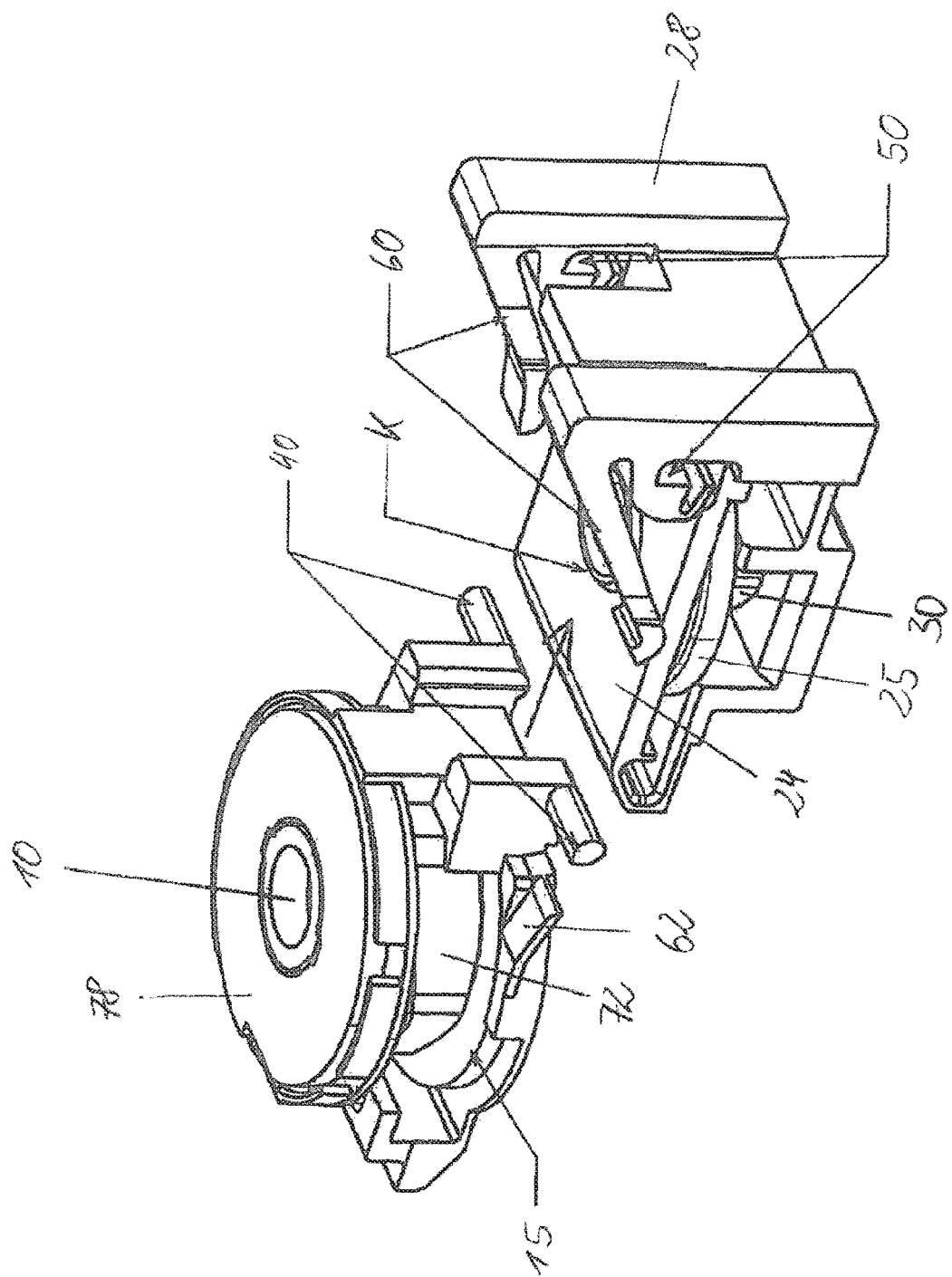
Figure 3:
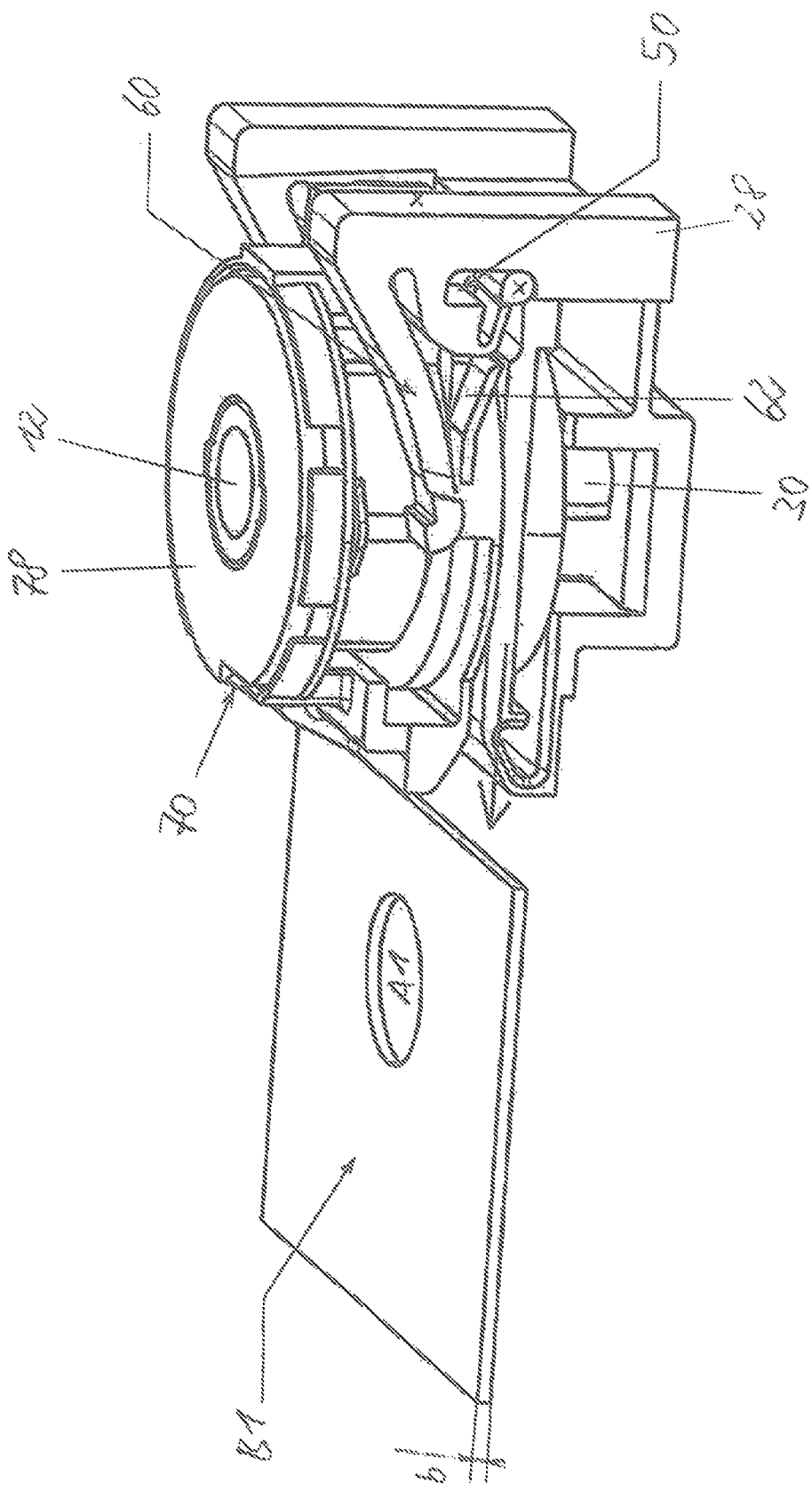
Figure 4:
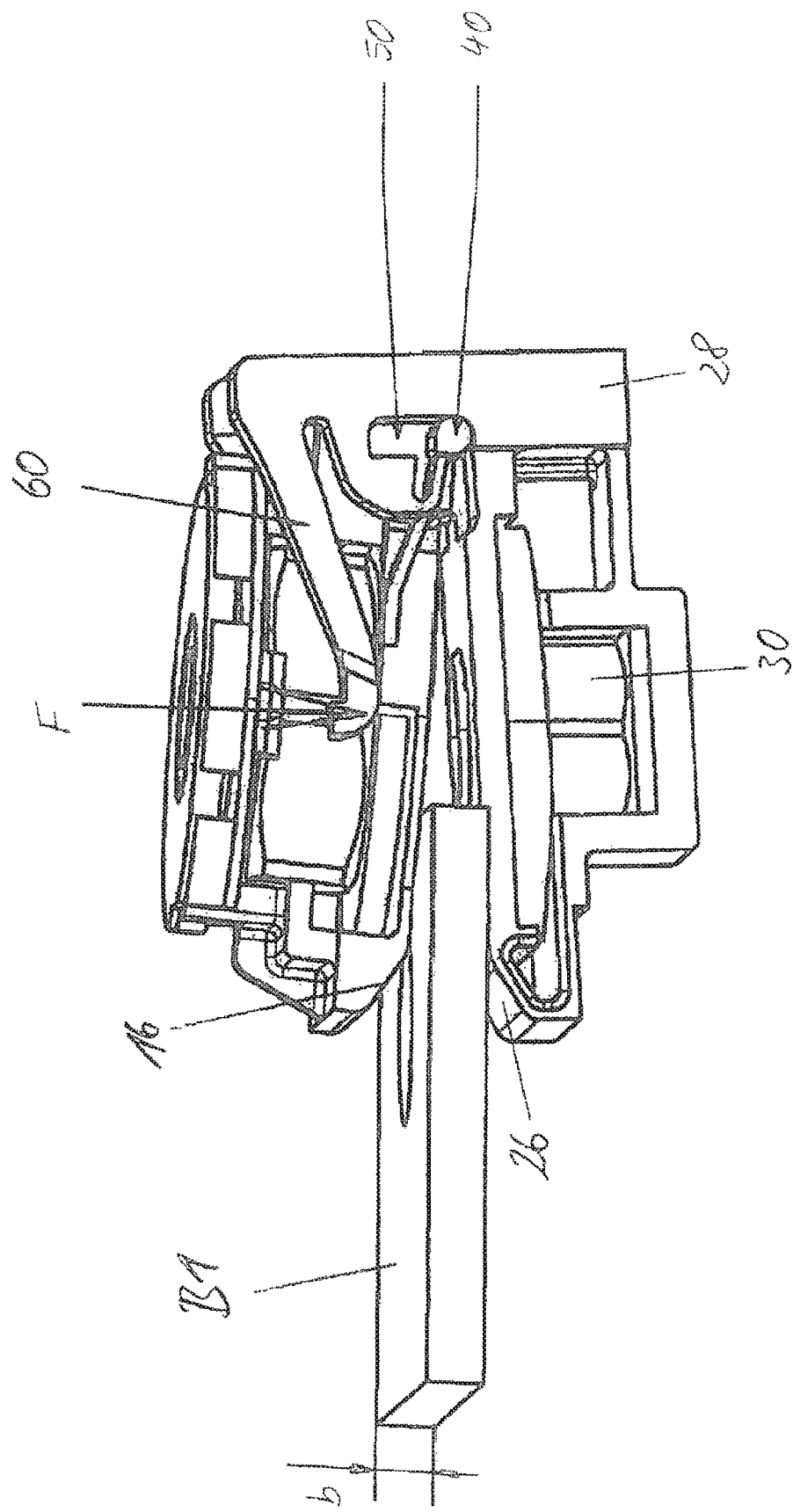
Figure 5:
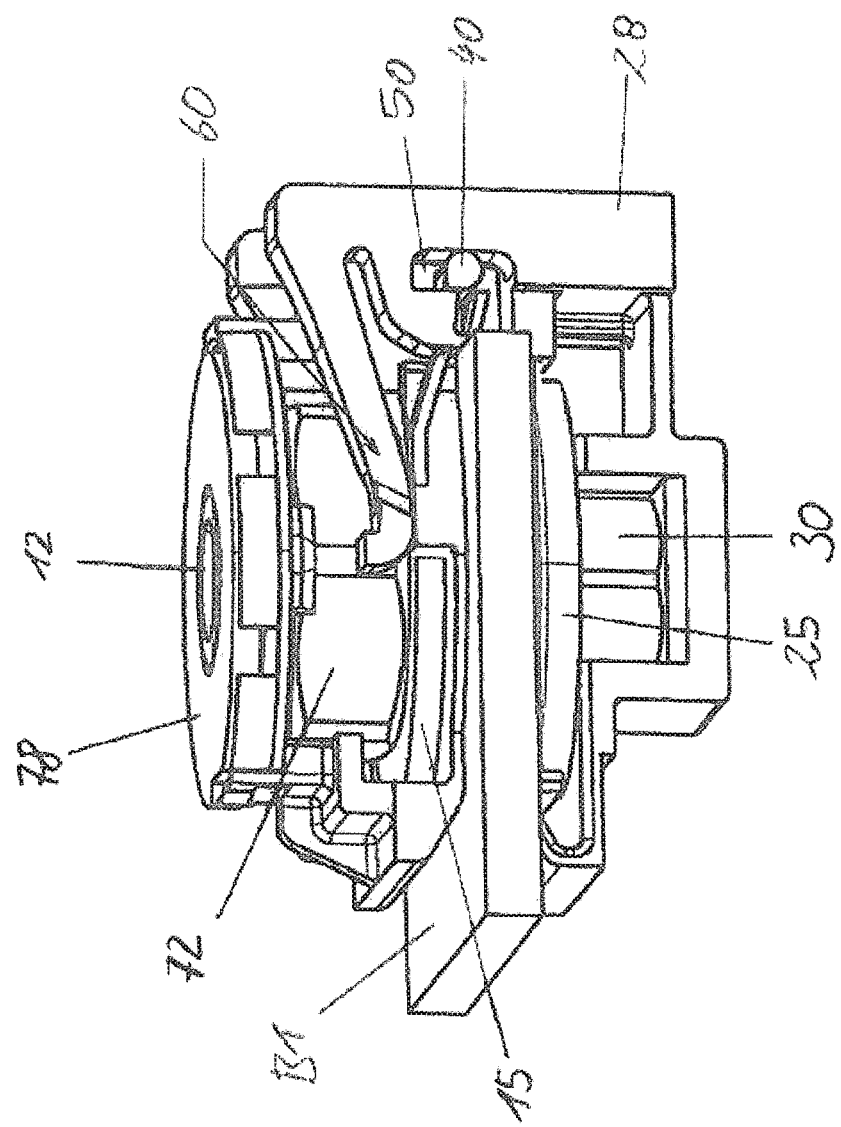
Figure 6:
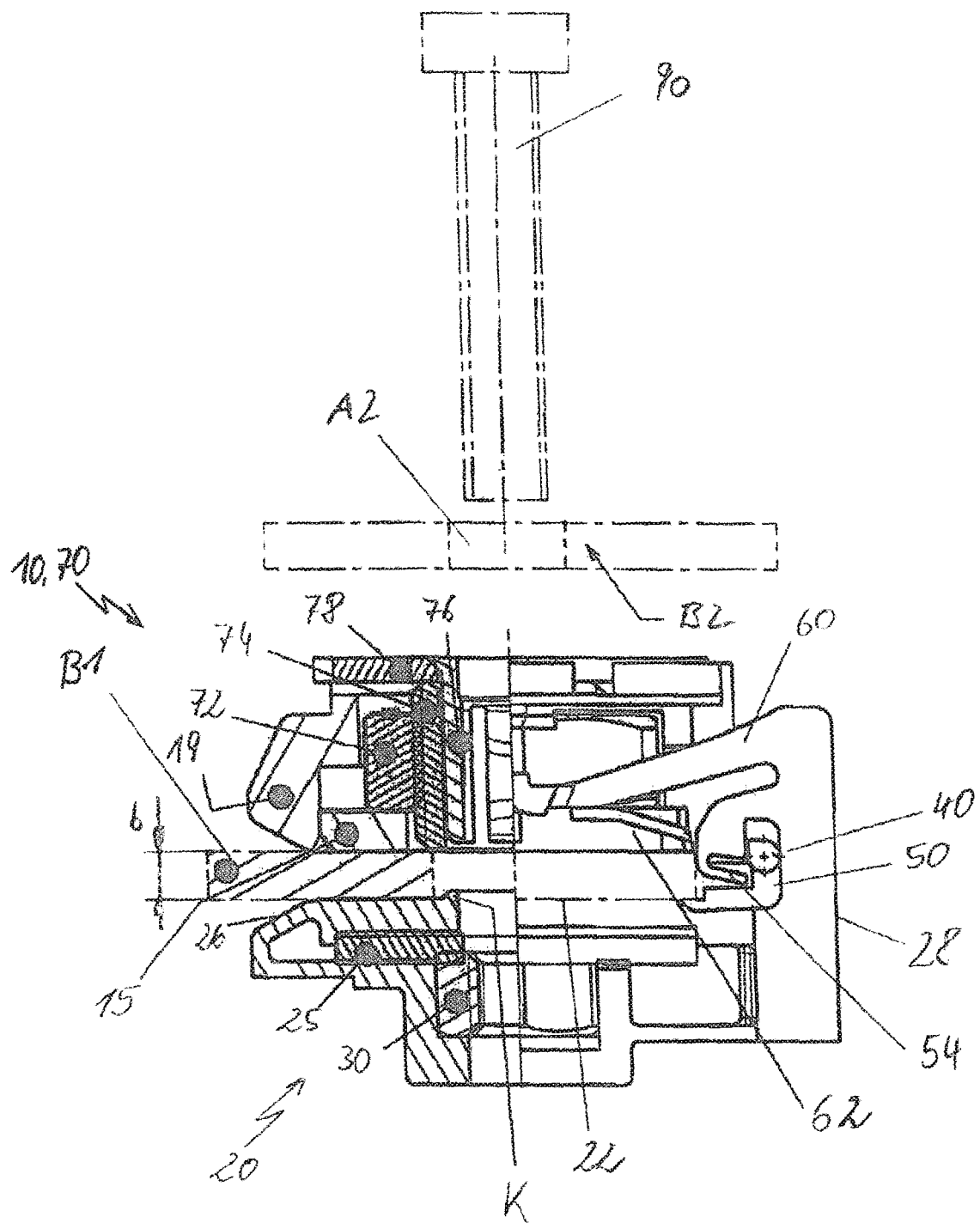
Figure 7:
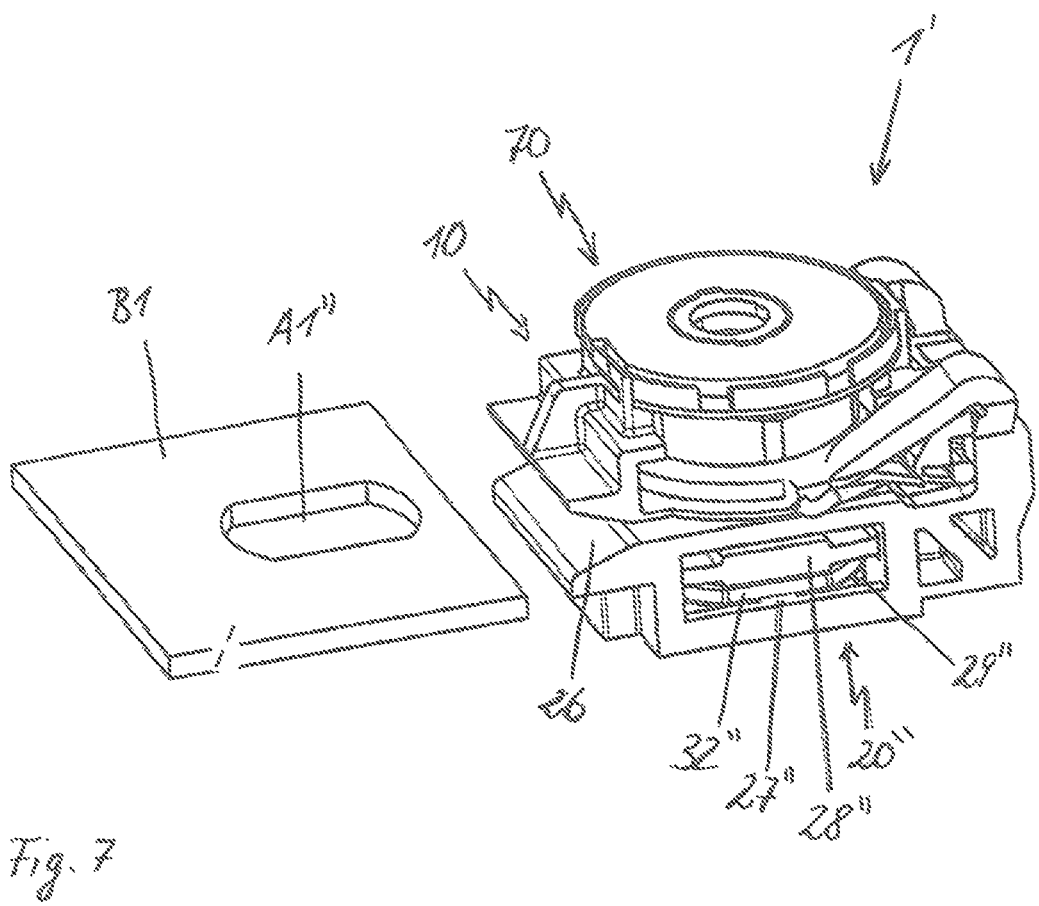
Figure 8:
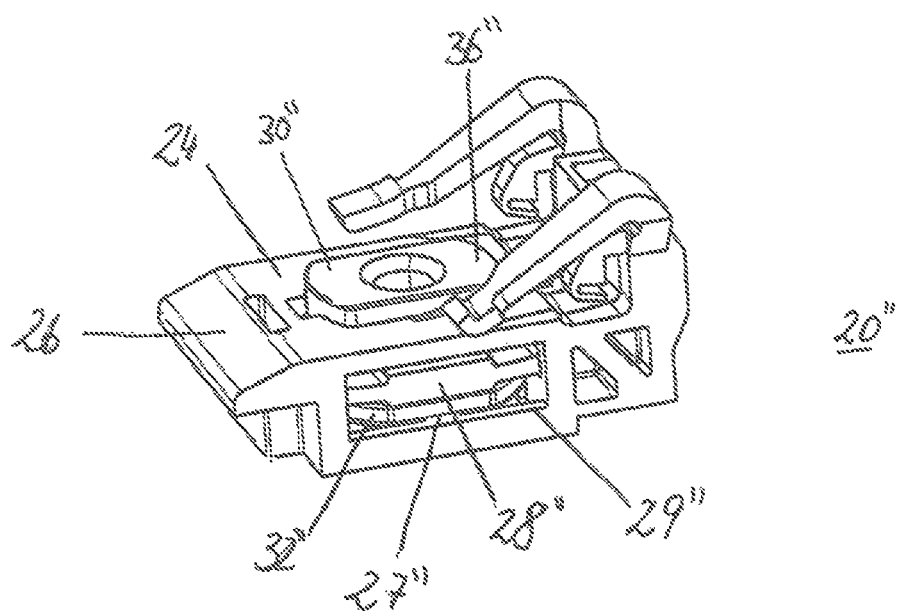
Figure 9:
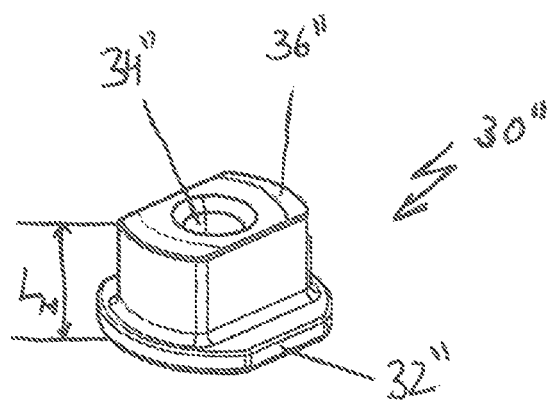
Figure 10:
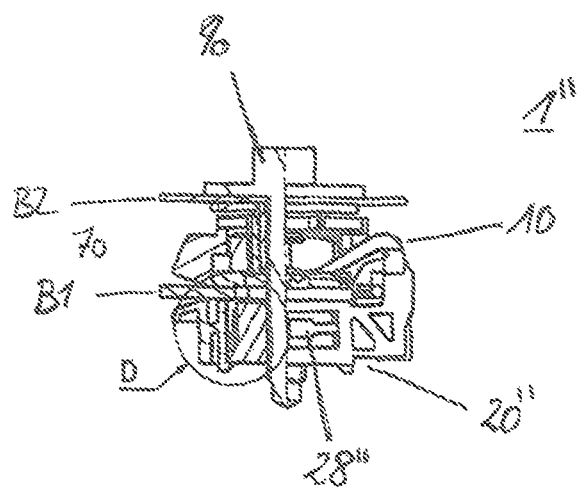
Figure 11:
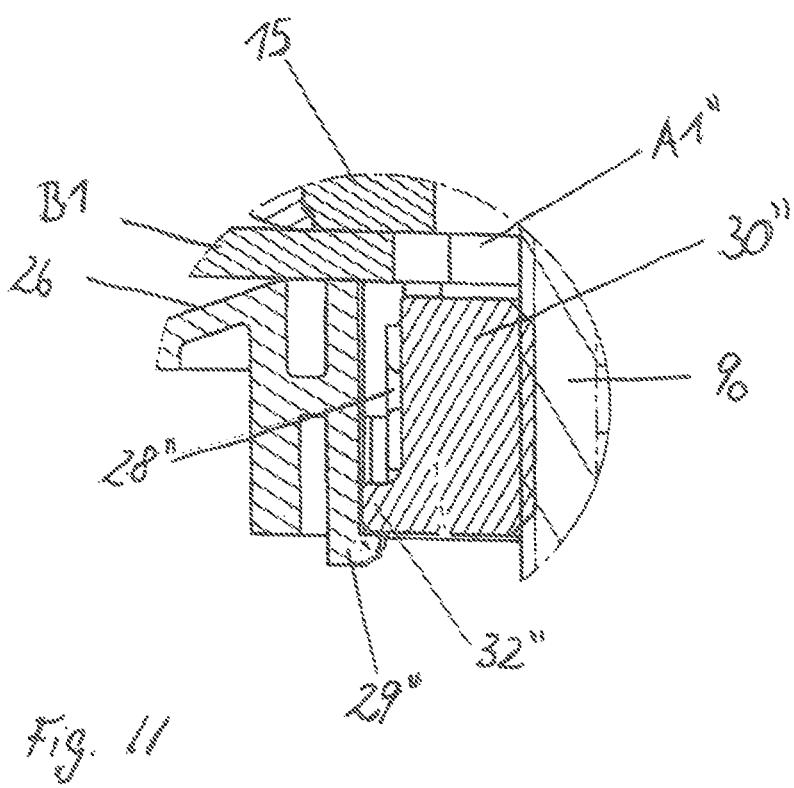
Figure 12:
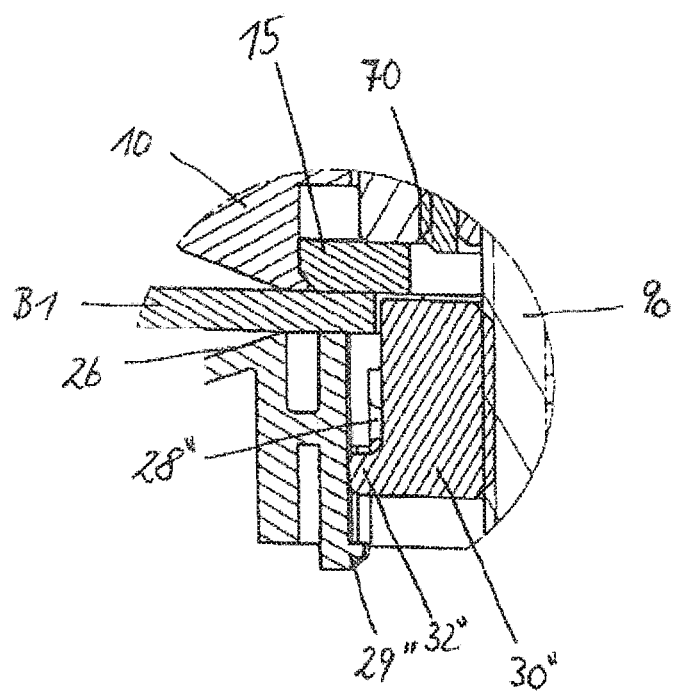
Figure 13:
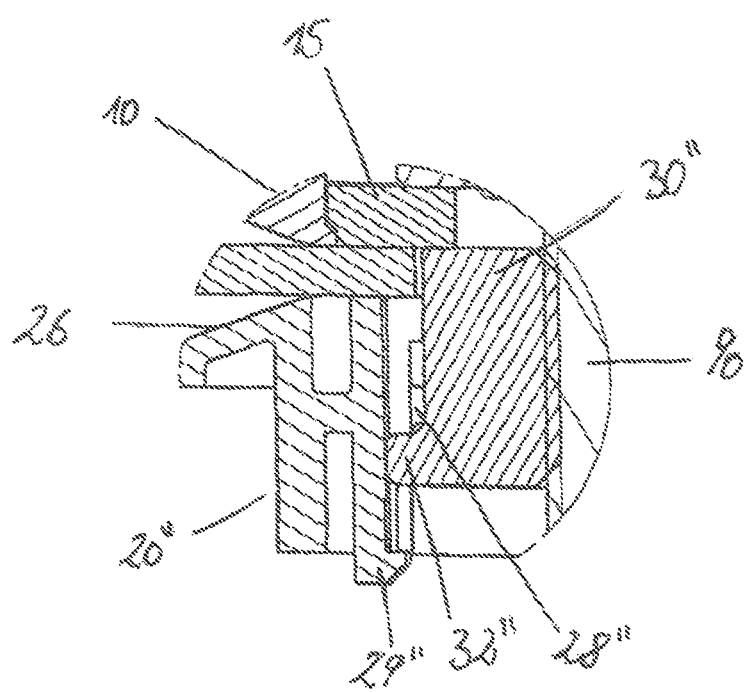
Figure 14:
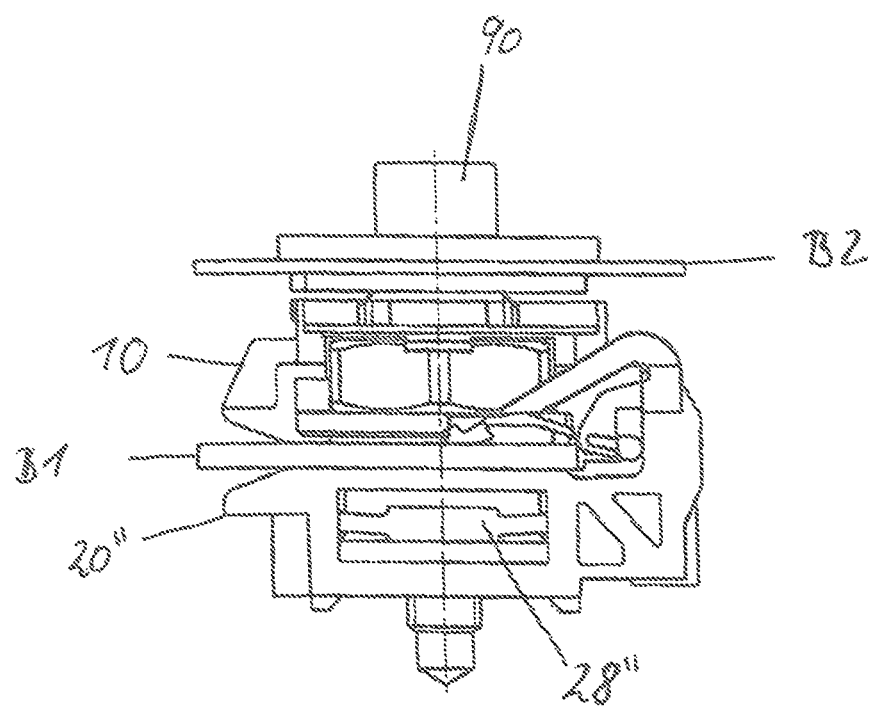
Figure 15:
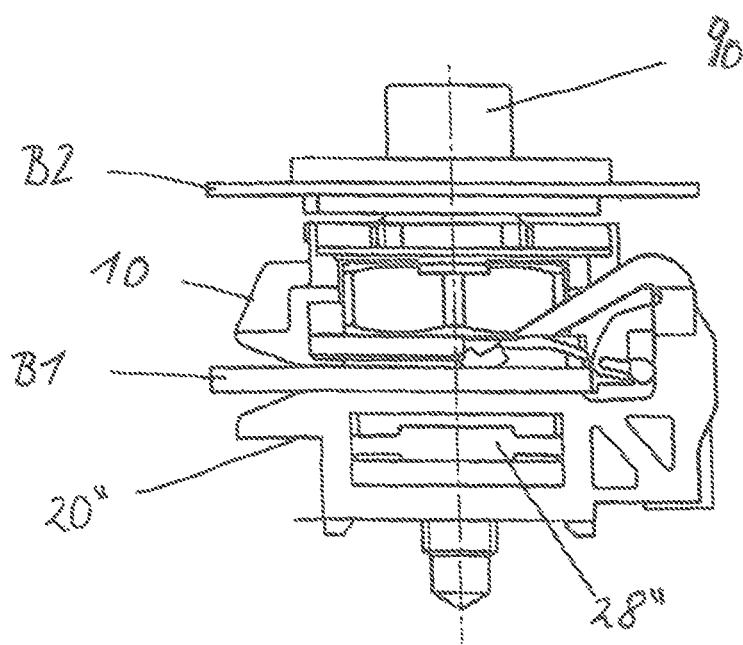
Figure 76:
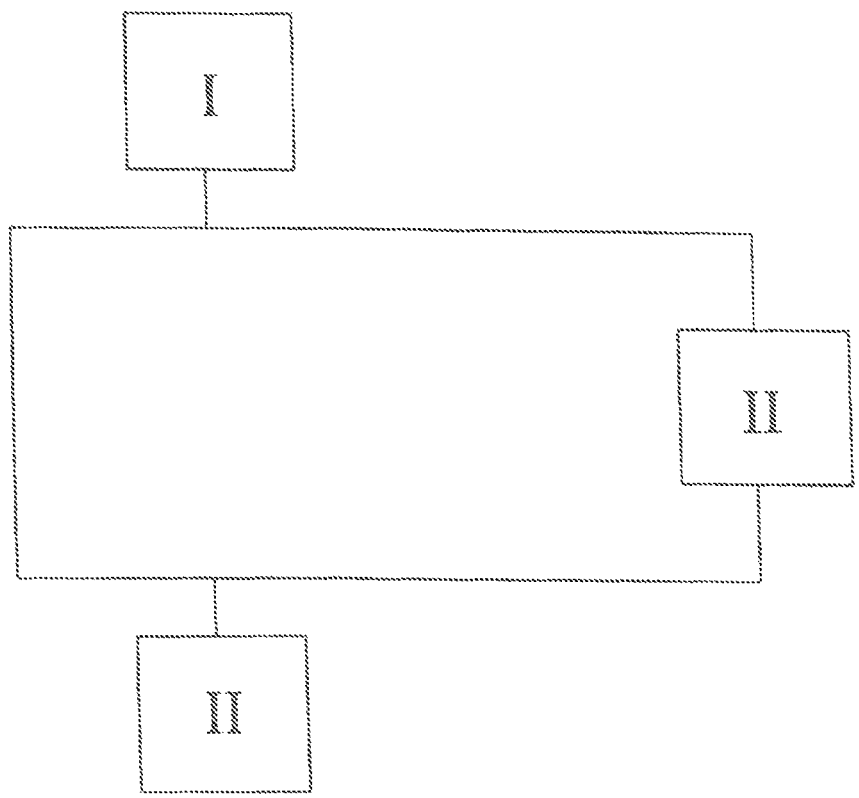
Figure 17:
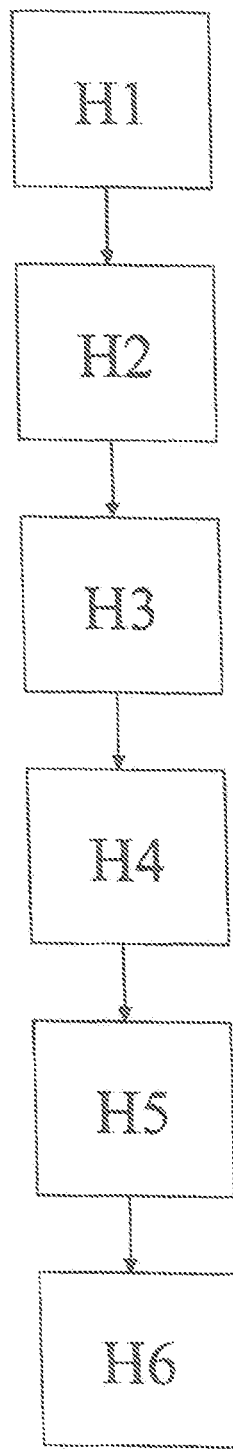

The embodiments of the present disclosure are now explained in detail with respect to the accompanying drawings. It shows:

FIG. 1 a first embodiment of the connector,

FIG. 2 a second embodiment of the connector with tolerance-compensating element, FIG. 3 the connector according to FIG. 2 in combination with a component of a first component thickness, FIG. 4 the connector according to FIG. 2 in combination with a component of a second component thickness during the inserting of the component into the connector, FIG. 5 the connector in combination with the component of FIG. 4, FIG. 6 schematical depiction of the connector according to FIG. 2 in combination with a second component and a fastening screw, FIG. 7 a further embodiment of the connector, FIG. 8a an enlarged depiction of the second leg of the connector according to FIG. 7 in a first inserting position of the nut, FIG. 8b an enlarged depiction of the second leg of the connector according to FIG. 7 in a further inserting position of the nut, FIG. 9 a further embodiment of a nut of the connector according to FIG. 7, FIG. 10 a lateral cross-sectional view of the connector according to FIG. 7, FIG. 11 an enlarged depiction of the encircled portion of FIG. 10, FIG. 12 a further detail from the enlarged depiction of the encircled portion of FIG. 10, FIG. 13 a further detail from the encircled portion in FIG. 10 in an enlarged depiction, FIG. 14 a side view of the connector with a fastening screw, FIG. 15 a further side view of the connector with fastening screw, FIG. 16 a flow chart of an embodiment of the connecting method, and FIG. 17 a flow chart of an embodiment of the production method of the connector.

5. DETAILED DESCRIPTION

The present disclosure comprises a connector 1 of various embodiments. The connector 1 may be fastened in a first component opening A1 of a first component B1. The first component opening A1 is arranged close to an outer edge of the first component B1 so that the connector 1; 1' is plugged onto the edge of the first component B1 for producing a connection. Therefore, the connector 1; 1' is also denoted as edge connector.

The connector 1; 1' preferably provides a first fastening element 30, for example a fastening thread in a nut or in a molded or formed cylinder or a locking element, at the first component opening A1. The first fastening element 30 is connectable to a second fastening element 90, for example a fastening screw. If the second fastening element 90 runs through for example a second component opening A2 in a second component B2 (see FIG. 6), the connector 1; 1' as well as the first component opening A1 in the first component B1, then the second component B2 is connected to the first component B1 by means of the connector 1; 1' by screwing the second fastening element 90 into the first fastening element 30. To this end, the connector 1; 1' provides the first fastening element 30 adjacent to or at the exit of the first component opening A1.

The connector 1; 1' comprises two oppositely arranged legs 10, 20 each having an opening 12, 22. The legs 10, 20 are preferably formed areally or two-dimensionally, at least adjacent to a component surface of the first component B1. Two-dimensionally or areally in this context means that the legs 10, 20 provide a flat support 14, 24 adjacent to the component surface which must not necessarily be formed as a continuous areal element. On the contrary, alternatively to the continuous areal element, also structured supports are preferred which are formed for example by a plurality of areal elements like webs, humps or the like.

Preferably and adjacent to the flat support 14, 24, a structural reinforcement 15, 25 is enclosed in the respective leg 10, 20 at the side facing away from the first component B1, respectively. This may be a metal or plastic disc which serves as a load distributor in the respective leg 10, 20. For this purpose, the legs 10, 20 are constructed cage-like so that holding structures like webs, bridges, indentations and/or recesses are present which hold the reinforcement 15, 25 in its position.

Preferably, the legs 10, 20 are provided made of plastic. Depending on the application of the connector 1; 1', here also material combinations like fiber-reinforced plastics or hybrid constructions of metal and plastic are used. Preferably, an injection molding method is used for producing the connector (1; 1) with the legs 10, 20.

At the side facing away from the component B1, the leg 20 comprises the first fastening element 30 in the form of hexagonal nut 30 with fastening thread held in a cage. The hexagonal nut 30 may abut the adjacent reinforcement 25 or is connected thereto. As the hexagonal nut 30 or a threaded element formed differently can be plugged into the cage-like leg 20, threaded elements with different thread sizes are combinable with the connector 1; 1'. It is also preferred to form the first fastening element 30 integrally in the leg 20.

For facilitating an inserting of the first component B1 between the legs 10, 20, preferably insert bevels 16, 26 are provided adjacent to the supports 14, 24. They support an angular opening of the legs 10, 20 and a continuous smooth transition of the first component B1 from the outside of the connector 1; 1' between the two legs 10, 20 of the connector 1; 1'.

The legs 10, 20 which are characterized by the areal support 14, 24 are connected to each other at a circumferential side of this support 14, 24 in a form-fit manner. This form-fit connection first of all ensures an alignment of the legs 10, 20 with respect to each other so that the openings 12, 22 are aligned substantially coaxially to each other. This ensures an easy inserting of the second fastening element 90, the fastening screw according to FIG. 6, into the openings 12, 22. Further, the form-fit connection ensures an angular opening of the legs 10, 20 from a previously parallel arrangement for arranging the first component B1 between the legs 10, 20. Further, the form-fit connection makes a variable distance variation of the legs 10, 20 with respect to each other possible, regardless of whether they are in parallel or angular alignment with each other. This distance variation ensures that the connector 1; 1' is adjustable in its distance of the legs 10, 20 to different component thicknesses B without losing its structural unity, its ideal positionability and the alignment of the openings 12, 22 as well as its binding.

The form-fit connection between the legs 10, 20 is preferably formed by a rotational axis 40 guided in at least two elongated holes 50. At this, the elongated holes are provided at one of the legs 10, 20, preferably at the leg 20, and the rotational axis 40 is provided at the other leg, preferably the leg 10. According to a further embodiment, the rotational axis 40 is formed by two webs arranged coaxially with respect to each other having an approximately round cross-section. According to an alternative, these webs consist of plastic. According to a further embodiment, a continuous rotational axis made of metal or plastic is realized or the above-mentioned webs are provided made of metal. The webs are arranged radially outwardly with respect to the diameter of the legs 10, 20. Due to this, the stability of the legs 10, 20 during the pivoting is improved compared to a radially inner arrangement.

The webs or generally the rotational axis 40 is guided in the elongated holes. At least two stabilizing webs 28 may be provided at the legs which extend perpendicular to the flat support 24. Within these webs 28, elongated holes 50 in the form of recesses are arranged which may extend perpendicular or also angularly but in each case outside of the plane of the support 24. The elongated holes 50 are formed closed at the side facing away from the support 24. The side of the elongated holes 50 facing the support 24 is broken or open-worked at its end adjacent to the support 24 to form an insert opening 52 for the rotational axis 40 or the webs. Preferably, the insert opening 52 is at least partly closed by a resilient tongue 54 formed in the stabilizing web 28. This tongue 54 extends according to an embodiment in insertion direction of the rotational axis 40 and is fastened at the side of the stabilizing web 28 facing the support 24. Due to this, the tongue 54 can be displaced upon the inserting of the rotational axis 40 while it at least partly blocks a removing of the rotational axis 40 out of the elongated hole 50.

The inner surface of the elongated hole 50 facing the support is formed at its upper end preferably approximately rectangular and not round. In a similar way, the cross-section of the rotational axis 40 is formed not round. To this end, the side facing the support 14 has an approximately flat surface section which is angular towards the closed end of the elongated hole 50 and not round. The cross-sectional design of the rotational axis 40 is adapted to the final shape of the elongated hole to support an opening of the legs 10, 20 upon inserting the first component B1 and to avoid an alignment of at least the leg 10 with a negative angle with respect to the support 24 of the other leg 20.

The rotational axis 40 may be held steplessly, thus freely, displaceable in the elongated holes 50. This is ensured by means of a flat design of the inner surfaces of the elongated holes 50. Further, the inner surfaces of the elongated holes 50 facing away from the support 24 have a stepped structure (not shown) in which the rotational axis 40 can be displaced. This structure forms an intermediate locking between the final points of the elongated holes 50 for pre-selecting or adjusting different distances between the legs 10, 20.

While both elongated holes 50 in the two stabilizing webs 28 are formed open on one side, it is also preferred to form only one of the elongated holes 50 open. Further, it may be preferred to provide the stabilizing webs 28 in the shape of a continuous wall in which the elongated holes 50 are connected with each other as one elongated hole. For facilitating the inserting of the rotational axis 40 into the elongated hole 50, the tongues 54 are arranged solely at the ends of the elongated holes 50.

For supporting the connection to the first component B1, the fastening element 30 is preferably arranged in an indentation of the stabilization 25. Further, the stabilization 25 may be enclosed between the cage of the fastening element 30 and the bottom of the support 24 and fixed in its position.

According to a further embodiment, the opening 22 is surrounded within the support 24 by a collar K which protrudes in the direction facing away from the fastening element 30. Upon inserting the first component B1 between the legs 10, 20, the collar K engages in the first component opening A1 and serves in this way as positioning aid for the connector 1; F. It is also preferred to provide an oppositely protruding collar at the edge of the opening 12 in the support 14 (not shown).

For inserting the rotational axis 40 into the elongated holes 50, the rotational axis 40 is snapped into the elongated holes 50 past the springy or resilient tongues 54. At the same time, preferably at least one spring arm 60 of the leg 20 moves along a collide bevel 62 of the leg 10. The at least one spring arm 60 is hinged to the stabilizing web 28 and extends inwardly into the flat support 24 and inclined towards the flat support 24. By means of the colliding of the at least one spring arm 60, preferably at least two spring arms, the spring arm 60 is displaced away from the support 24. Thereby, it establishes a pressure force F (see FIG. 4) on the leg 10 so that the two legs 10, 20 are pressed against each other. This pressure force F of the legs 10, 20 against each other provides a transport lock for the pre-installed connector so that the leg 10 cannot be released from the elongated holes 50. Further, this pressure force F supports an alignment of the legs 10, 20 with respect to the opposite first component B1 as it is explained below in detail. It is also preferred that the at least one spring arm 60 first of all creates a pretension force towards the leg 20 if the component B1 is inserted between the legs 10, 20.

In FIGS. 3 and 4, first components B1 having different component thicknesses B are shown, on the edge of which the connector 1; 1' is plugged. Depending on the component thickness B, the position of the rotational axis 40 in the elongated holes 50 is varied. At the same time, the form-fit connection of the legs 10, 20 ensures a flat abutting of the supports 14, 24 on the first component B1 so that the openings 12, 22 and A1 are aligned substantially coaxially with respect to each other. From this it follows that the degrees of freedom with respect to the movability given to the legs 10, 20 by means of the form-fit connection ensure an ideal thickness adaption of the connector in a preferred component thickness range of 0.5 mm to 8 mm, preferably 0.8 mm to 4 mm. Further, by means of the rotatable support of the rotational axis in the elongated holes 50, a canting or jamming between the legs 10, 20 is avoided at the moving of the first component B1.

During the inserting of the first component B1 between the legs 10, 20, the leg 10 is displaced angularly against the pressure force F of the spring arms 60. After the leading side of the first component B1 has passed the engagement point of the spring arm 60, preferably the center of the support 14, the support 14 is pressed areally onto the surface of the first component B1. At the same time, the rotational axis 40 makes a respective compensation movement within the elongated holes 50 as can be seen based on the comparison of FIG. 4 and FIG. 5. In FIG. 5, the first component B1 is completely inserted between the legs 10, 20.

Now, the fastening element 90 is fastened through the openings 12, 22 and the component opening A1 in the fastening element 30, preferably the fastening screw 90 is screwed into the fastening thread 30. For fastening a second component (not shown) at the first component B1, spaced at least by the leg 10 from the first component B1, it is arranged with its component opening above the opening 12 prior to the fastening of the fastening element 90. It is understood that, thus, also more than two components having each a component opening can be connected with each other by means of the connector 1; 1'.

FIGS. 2 to 6 show a further embodiment of the connector 1', the leg 10 of which is provided with a tolerance compensation element 70. Despite the tolerance compensation element, the connector 1' has the same constructive features as the connector 1. As tolerance compensation element 70, the leg 10 comprises adjacent to the reinforcement 15, preferably a metal disc, a threaded element 72. According to a further embodiment, the threaded element 72 is a hexagonal nut or a thread cylinder which is held in a cage 19 of the leg 10. The threaded element 72 comprises an inner thread of a first thread turn direction in which an adjusting element 72 is guided. The first thread turn direction of the inner thread of the threaded element 72 is opposite to a second thread turn direction of the fastening thread in the fastening element 30. As soon as the fastening screw 90 having an outer thread fitting to the fastening thread is screwed into the adjusting element 72, a drag element or dragger 76 being arranged in the interior of the adjusting element 72 produces a co-rotating of the adjusting element 72 by means of a frictional connection between the fastening screw 90 and the adjusting element 74. Thereby, the adjusting element 74 is rotated with the fastening screw 90 and out of the threaded element 72 until it is in abutment with the second component B2. There, the adjusting element 72 abuts by means of a supporting disc 78, for example a steel or a plastic disc. The supporting disc 78 is supported by circumferential webs. The dragger 76 consists of a metallic spring element, a plastic layer or another elastic or structural construction which can be overcome by a specific torque of the fastening screw 90.

As a further rotating of the adjusting element 74 is prevented, the fastening screw 90 overcomes the frictional connection of the dragger, is screwed further into the connector 1' and fastened in the fastening element 30.

As has been mentioned already above, the connector 1; 1' may be produced by injection molding. Also, other shaping methods for plastics are suitable as far as the stability of the connector 1; 1' is ensured. In respective injection molds, the negatives of the above described structural features are provided and filled subsequently with plastic.

After the demolding of the legs 10, 20, the fastening element 30 is installed in the leg 20. According to a further embodiment, the above-described tolerance compensation element 70 is fastened at the leg 10 to obtain the connector 1'.

A further embodiment of the connector 1" is shown in FIGS. 7 to 15. Reference signs related to the same constructive elements as in the above-described embodiments are denoted with the same reference signs. Further, the already above discussed features and functions of constructive elements apply in the same way for the same constructive elements of further embodiments except differences result from the description and/or the drawings.

According to a further embodiment of the connector 1', it may be necessary or desirable to fasten the two components B1, B2 by means of a high strength screwing at each other. To this end, a secure screwing of the components B1, B2 to each other results which cannot be released. For such a high strength screwing, for example a screw 90 having a thread M6 and a pretension force of 10 kN is used.

At the connector 1; 1' of FIGS. 1 to 6, the flux of force of the fastening screwing runs through the connector 1; 1' and loads the material of the connector 1. The connector 1, 1' may consist of plastic according to an embodiment of polypropylene (PP) which has only a limited pressure strength. Thus, the plastic yields due to its behavior a fastening pretension whereby the pretension relaxes and the fastening of the connector 1; 1' can be affected.

FIGS. 7 to 15 show a further embodiment at which the fastened pretension is almost maintained. Further, the leg 10 and further preferred, the above described tolerance compensation element 70, is clamped in the fastening screwing 90, 30' for reducing creep processes in the material of the connector 1".

For fastening the leg 20" at the first component B1, the component B1 comprises the component opening A1". The component opening A1" serves for receiving a longitudinally designed nut 30" as it is shown in FIG. 9 according to an embodiment. For providing a rotation-lock of the nut 30" by means of the component opening A1', the nut 30' and component opening A1" may be formed not round, here preferred the component opening A1" as longitudinal hole and the nut 30" elliptically in the cross-section. The nut 30" protruding in its longitudinal direction, also parallel to the thread opening, into the component opening A1" is thus held form-fit against rotation around its longitudinal axis in the component opening A1". Besides the rotation-lock, the not round cross-sectional surface of the nut 30" also provides an additional contact or abutment surface 36" of the nut 30" at the reinforcement 15 of the leg 10 as explained in detail below. Besides the here described elliptical cross-sectional design of the nut 30", also other nut constructions and component openings adapted thereto are applicable in component B1 as far as a rotation-lock and a sufficient supporting of the second leg 10" at the nut 30" is ensured by a constructive design of the nut 30" and/or the leg 20" and/or the component opening A1".

As can be seen based on FIG. 8, the length L of the nut 30' is such that it protrudes beyond the support 24 of the leg 20". The nut 30" is according to a preferred embodiment shown in FIG. 9. It comprises besides the elliptically cross-sectional design and the specific length $L_M$ a circumferential collar 32". The collar 32" protrudes radially beyond the remaining nut body and may be arranged at an axial end of the nut 30". It is also preferred to form the collar 32" radially open. Within the thread opening 34", the nut 30" comprises a thread adapted to the fastening screw 90.

The nut 30" has further preferably a cross-sectional surface $A_M$ with respect to the thread opening 34". The cross-sectional surface $A_M$ is sufficiently large to provide preferably in an edge portion of the nut 30" a supporting or a contact surface 36" for the further leg 10'. As the nut 30" protrudes due to its length $L_M$ through the component opening A1", it is preferably supported at the reinforcement 15". At this, preferably no relaxing material, for example of the leg 10", is interposed in the supporting so that a direct supporting between the nut 30" which may consist of steel and the reinforcement 15" which also may consist of metal takes place (see FIG. 13). In this context, it is further preferred to provide the elements interposed between the head of the fastening screw 90 and the reinforcement 15 from approximately relaxation-free material. Therefore, preferably the elements 72, 74, 76 of the tolerance compensating element 70 are made of relaxation-free plastic or of metal.

As has been indicated already above, the nut 30" consists for this purpose of a relaxation-free material according to an embodiment, as for example steel or a similar metal, ceramic or the like.

FIG. 10 shows a partial sectional side view of the connector 1" which connects the two components B1 and B2 by means of a tolerance compensation 70. The encircled portion D is enlarged and is shown in different phases of the installation of the connector 1" with nut 30" in FIGS. 11 to 13.

With respect to FIG. 8*a*, the nut 30" is inserted in the direction of the leg 10 into the leg 20". At this, it is at least rudimentarily moved in longitudinal direction into the opening 22' which is adapted to the cross-sectional design of the nut 30 in its shape. In a first insertion position, the collar 32" locks behind a locking hook 29" which forms an undercut against the insertion direction of the nut 30". The locking hook 29" is arranged within the cage of the leg 20". By means of the locking hook 29", the nut 30" is held loss-secure within the cage of the leg 20".

A radially inwardly protruding and springy arranged cam or web 27" may be provided at the cage of the leg 20". The cam 27" hinders in the first insertion position a further moving of the nut 30' into the leg 20" as the cam 27" blocks the further movement of the collar 32". The collar 32" may be thus held between locking hook 29" and cam 27". In this way it is ensured that the inserted nut 30" protrudes not beyond the support 24. Further, an inserting of the component B1 is not hindered by the nut 30". Furthermore, this releasable fixation provides a transport-lock for the nut 30" in the leg 20".

After the first component B1 has been inserted between the legs 10, 20", the fastening screw 90 is screwed into the nut 30" through the components B1, B2. At this procedure, the nut 30" is displaced axially towards the leg 10. To this end, first of all the collar 32" is released from the fixation between locking hook 29" and cam 27" and the nut 30" axially protrudes beyond the supporting 24 (see FIGS. 12, 8*b*).

By rotating the fastening screw 90 further, the nut 30" is further screwed so that the collar 32" abuts at the spring web 28". Preferably, two spring webs 28" opposite to each other are provided at which the collar 32" and thus the nut 30" are supported at their elliptical longitudinal sides.

In this position, which is shown in FIG. 12, the nut 30" protrudes into the component opening A1". Compared to the embodiment of the connector 1, the reinforcement 15, preferably a metal disc or steel disc with through opening, protrudes radially into the component opening A1". This results preferably from the elliptical cross-sectional design of the nut 30" and the opening 22" in the leg 20" adapted thereto.

If the fastening screw 90 is tightened further, the spring webs 28" are deformed towards the leg 10 until the nut 30" abuts at the preferred steel disc 15 (see FIG. 13). Now, the flux of force of the fastening of the connector 1" takes place preferably only through approximately relaxation-free material or a material at which the relaxation of impressed mechanical pressure tensions is negligibly low. This requires that also the threaded element 72, the adjusting element 74 and the supporting disc 78 consist of approximately relaxation-free material, as for example metal. According to this, the fastening screw 90 can be tightened with the desired pre-tension force.

Upon the tightening of the fastening screw 90, the nut 30" and thus the collar 32" are displaced axially against the spring force of the spring webs 28". Due to this, the leg 20" is pressed via the spring webs 28" against the components B1 or clamped there. The deforming of the spring webs 28", which may be fastened one-sided or two-sided, is variable for being able to adapt the leg 20" to different thicknesses of the first component B1. Preferably, the spring webs 28" are bent against the fastening direction of the nut 30" in the un-displaced condition. Thereby, a larger displacement range of the nut 30" and thus, a larger tolerance range for the thickness of the first component B1 is provided. Further, FIGS. 14 and 15 show the displacement of the spring webs 28" in axial direction of the fastening screw 90 if the nut 30" is tightened.

The clamping force of the leg 20" at the component B1 may be between 3% and 6% of the pretension force applied by the fastening screw 90. At a fastening screw having an M6 thread, a clamping force of 300 to 600 N is for example achieved thereby. This clamping force is sufficiently high for a secure clamping fit of the leg 20" and thus the connector 1". The clamping force is further sufficiently low so that the material of the leg 20" has preferably no creep behavior. Thus, the clamping forces are not relaxed and the fastening of the leg 20" at the first component B1 is not affected. From this it follows that the pretension force of the screwing is maintained and preferably the flux of force of the screwing is guided only through metal, preferably steel.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. Connector for at least a first and a second component having a distance therebetween, having the following features:
   a first leg with a first opening as a first part and a second leg with a second opening as a second part, distinct from the first part,
   which are movably connected to each other by a one-sided form-fit connection so that
   a distance between the first and the second leg is adjustable freely or stepwise in a predefined interval and
   a component having a component opening is receivable between the first and the second leg and the connector is fastenable in the component opening by a fastening element, wherein
   the first and the second leg are connectable to each other by a web provided on one of the first and second leg, where said one of the first and second leg is received in an elongated hole provided in the other of the first and second leg, and wherein the first and second leg are arranged pivotably around the web, wherein the web is displaceable within the elongated hole perpendicular to a pivoting axis defined by the web, and
   in which the pivoting axis is arranged in two oppositely positioned elongated holes, having a longitudinal extension outside of a plane of the first and second leg.

2. Connector according to claim 1, in which the second leg has a fastening thread adjacent to the second opening.

3. Connector according to claim 2, in which the fastening thread is formed by a nut held in a cage.

4. Connector according to claim 3, in which the nut has a longitudinal extension so that it extends through the component opening of the first component in the fastened condition of the second leg for being supportable at the first leg.

5. Connector according to claim 4, in which the second leg is braceable against the first component in a press-fit by the nut.

6. Connector according to claim 4, in which the first leg comprises a reinforcement, which protrudes at least partly into the component opening so that the reinforcement is engageable by the nut.

7. Connector according to claim 1, in which the first leg comprises a tolerance compensating element for compensating tolerances between the first and the second component.

8. Connector according to claim 2, in which the first leg comprises a threaded element in the inner thread of which an adjusting element is guided, wherein a first thread turn direction of the inner thread is opposed to a second thread turn direction of the fastening thread of the second leg.

9. Connector according to claim 8, in which the adjusting element comprises an inner dragging element for providing a frictional connection with a fastening screw.

10. Connector according to claim 1, in which the first and second leg are pre-tensionable with respect to each other by at least one spring arm.

11. Connecting method for a first and a second component having a distance therebetween using the connector according to claim 1, comprising the following steps:

inserting of the first component between the first and the second leg of the connector and at this displacing the first and second leg guided with respect to each other by the form-fit connection and fastening a second component with a fastening screw at the first component with connector by screwing the fastening screw into a fastening thread of the second opening of the second leg.

12. Connector according to claim 5, in which the first leg comprises a reinforcement, which protrudes at least partly into the component opening so that the reinforcement is engageable by the nut.

13. Connecting method according to claim 11, comprising the further step:

displacing an adjusting element into abutment with the second component by screwing the fastening screw into the adjusting element so that tolerances between the first and second component are compensated.

* * * * *

UNITED STATES PATENT AND TRADEMARK OFFICE
CERTIFICATE OF CORRECTION

| | | |
|---|---|---|
| PATENT NO. | : 10,746,220 B2 | Page 1 of 1 |
| APPLICATION NO. | : 15/300330 | |
| DATED | : August 18, 2020 | |
| INVENTOR(S) | : Hans-Ulrich Figge | |

It is certified that error appears in the above-identified patent and that said Letters Patent is hereby corrected as shown below:

On the Title Page

Under Related U.S. Application data after (60) delete "Provisional application No. PCT/EP2015/057104, filed on Mar. 31, 2015"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*